UNITED STATES PATENT OFFICE 2,378,783

PROCESS OF PRODUCING CYANINE DYES

Paul Nawiasky, Summit, N. J., and Robert James Speer, Lufkin, Tex., assignors to General Aniline & Film Corporation, New York, N. Y., a corporation of Delaware No Drawing. Application July 7, 1943,
Serial No. 493,709

14 Claims. (Cl. 260—240)

The present invention relates to the production of trimethine cyanine dyes and particularly those in which the carbon atom in the meso position of the trimethine chain is monosubstituted by an alkyl or mono-cyclic aryl radical.

It is proposed in U. S. P. 2,107,379 to produce trimethine cyanine dyes in which the meso carbon atom of the trimethenyl chain is substituted by an alkyl or aryl radical by reacting a cycloammonium quaternary salt of the type usual in the formation of cyanine dyes with an alkyl ester of a thioimide in which the nitrogen atom is substituted by a phenyl radical which may contain a methyl or nitro substituent. The process of the patent operates smoothly to produce the desired products in fairly good yields. It must be remembered, however, that it is a difficult matter to obtain high yields of cyanine dyes by the usual methods. In many cases the yields obtained in commercial processes amount to as little as 10 per cent. It is a rare case indeed when the yields obtained approach those of theory. Yields which are as high as 50 per cent, moreover, are the exception rather than the rule.

We have now found that the yields of trimethine cyanine dyes containing a substituent on the meso carbon atom of the trimethine chain can be greatly improved if the alkyl ester of the thioimide utilized for reaction with the cycloammonium quaternary salt is one in which the phenyl radical attached to the nitrogen atom of the thioimide is substituted in para-position by a halogen atom. The particular reason why improved yields are obtained when using thioimides of this character is unknown. In any case, despite any theory involved, the fact remains that by using our thioimides we obtain yields which are far superior to any that can be obtained when working according to the patent.

It is accordingly an object of our invention to produce trimethine cyanines the meso carbon atom of the trimethenyl chain of which is substituted by reacting a cycloammonium quaternary salt with an alkyl ester of a phenylated thioimide in which the phenyl radical is substituted in para-position to the nitrogen atom by a halogen atom.

It is a further object of the invention to produce trimethine cyanine dyes the meso carbon atom of the trimethenyl chain of which is substituted by reacting, in the absence of a condensing agent, a cycloammonium quaternary salt with an alkyl ester of a phenylated thioimide in which the phenyl radical is substituted in para-position to the nitrogen atom by a halogen atom and to further react the intermediate thereby produced with another cycloammonium quaternary salt.

It is a further object of the invention to provide a process which produces higher yields of trimethine cyanines than has been heretofore possible, by using in lieu of the usual alkyl esters of phenylated thioimides those in which the phenyl radical is substituted para to the nitrogen atom by halogen.

Other further objects of the invention will appear as the description proceeds.

The cycloammonium quaternary salts which may be used in our reaction are any of the cycloammonium quaternary salts which have the following constitution:

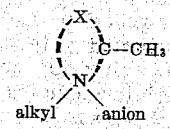

wherein X represents the atoms necessary to complete a heterocyclic nucleus of the type usual in cyanine dyes, anion means a salt-forming group such as iodine, chlorine, perchlorate, paratoluene-sulfate and the like, and alkyl means ethyl, methyl, propyl, butyl and the like. Examples of such compounds are 2-methyl-benzthiazole alkiodide, 2-methyl-benzselenazole alkiodide, 2-methyl-benzoxazole alkiodide, 2-methylpyridine alkiodide, quinaldine alkiodide, 2-methyl indolenine alkiodide, 2-methyl-thiazoline alkiodide, 2-methyl-selenazole alkiodide, lepidine alkiodide, and the like.

The thioimides which are utilized for reaction with said cycloammonium quaternary salts have the following general formula:

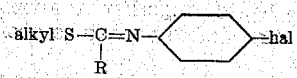

in which R is alkyl, such as methyl, ethyl, propyl, butyl, stearyl, and the like, or aryl, such as phenyl, chlorophenyl, methylphenyl, methoxyphenyl, ethoxyphenyl, aminophenyl and the like, and hal is halogen. The alkyl radical attached to the sulfur atom may be methyl, ethyl, propyl, butyl, hexyl, decyl, stearyl or the like. It is to be observed that the phenyl radical attached to the nitrogen atom bears as the only substituent the halogen atom in para-position to the nitrogen atom. It has been found that if substituents are present in ortho-position, the reaction is blocked. On the other hand, substituents in meta-position to the nitrogen atom have a tendency to interfere with the reaction.

The reaction is generally carried out in two stages, the first involving the reaction between the cycloammonium quaternary salt and the thioimide with the formation of the anilino vinyl intermediate, and the second involving the reaction of said intermediate with another cycloammonium quaternary salt which may be the same as or different from that used in producing the intermediate. It is preferable to use about equimolecular proportions of the cycloammonium quaternary salt and the thioimide and equimolecular proportions of the intermediate and the other cycloammonium quaternary salt. If the cycloammonium quaternary salt is used in an amount in excess of the thioimide, some symmetrical dyestuff is formed in the first stage along with the anilino vinyl intermediate. This of course means that the process may be operated in one stage where symmetrical dyestuffs rather than unsymmetrical dyestuffs are desired.

It is recommended that condensing agents be utilized to effect the reaction between the intermediate and the other cycloammonium quaternary salt. Such condensing agents should be basic in character. Condensing agents which I have found to be suitable are pyridine, triethylamine, tripropylamine, triethanolamine, dibutylamine, dimethylaniline, N-methyl piperidine, piperidine, and the like. It is to be pointed out, however, that condensing agents if employed in the preparation of the intermediate have a detrimental effect on the reaction. It is therefore advisable to avoid the use of such condensing agents when reacting the cycloammonium quaternary salt with the thioimide. It will be observed that in this respect the reaction also differs from that of the afore-mentioned patent, which suggests the use of acetic anhydride or pyridine in the production of the intermediates thereof.

The reaction between the cycloammonium quaternary salt and the alkyl ester of the phenylated thioimide is generally effected by heating. The temperature may range from about 100 to about 200° C., but the preferred temperature is in the neighborhood of 145 to 150° C. Generally lower temperatures are used in the second stage.

The invention is illustrated by the following examples, in which the parts are by weight. It is to be understood, however, that the examples are illustrative and not limitative.

*Example 1*

10 parts of 2-methyl-5-methoxybenzoxazole ethiodide and
10 parts of ethyl iso-thio-(4-chloropropionanilide) were heated together to about 148 to 150° C. for 2 hours, and the mixture cooled to 100 to 110° C.

Methanol was then added to the mixture, the same was chilled over night, filtered and washed with ether. There were thus obtained 8.8 parts of orange needles melting at 209° C., representing a yield of about 47.5 per cent of theory. The product thus obtained has the following structural formula:

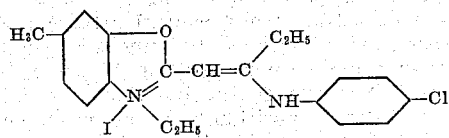

5 parts of 2.6-dimethylbenzthiazole ethiodide and
5 parts of the above-mentioned product were then reacted in
30 cc. of pyridine.

Ethyl acetate was added to the reaction mixture, the mixture being then filtered, washed with water, and crystallized from 95 per cent pyridine by means of ethyl acetate. There was thus obtained a product in the form of bluish-purple crystals melting at 154° C. in a yield of about 25.2 per cent of theory. The maximum light absorption of this compound is at 540 to 560 mu. The product, which is [3-ethyl-6-methyl-benzthiazole-(2)]-[3-ethyl-6-methoxy-benzoxazole-(2)]-beta-ethyl-trimethinecyanine iodide, has the following structural formula:

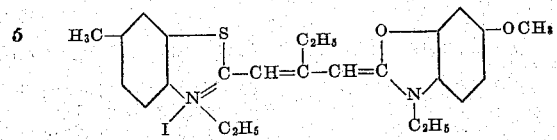

The procedure was repeated while using a thioimide in which the phenyl radical attached to the nitrogen atom was unsubstituted. In this case, the yield of the intermediate was 20 per cent of theory and the yield of the trimethine cyanine, 13.3 per cent of theory.

*Example 2*

5 parts of 2.6-dimethylbenzthiazole ethiodide were reacted with
5 parts of the intermediate of Example 3 in 30 cc. of pyridine.

A product was obtained in the form of dark green crystals melting at 237° C. in a yield of about 52.4 per cent of theory. The product has an absorption maximum at 560 to 580 mu. The product, which is bis[3-ethyl-6-methyl-benzthiazole-(2)]-beta-ethyl-trimethine cyanine iodide, has the following structural formula:

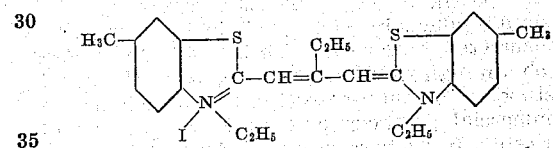

The procedure was repeated while using an intermediate derived from a thioimide in which the phenyl radical attached to the nitrogen atom is unsubstituted and wherein said phenyl radical is substituted in the para-position to said nitrogen atom by a methyl group on the one hand and by a nitro group on the other hand. The yield in the first instance was 27.7 per cent of theory and in the second instance, 15.2 per cent of theory and in the third instance, 14.7 per cent of theory.

*Example 3*

A mixture of
10 parts of 2.6-dimethylbenzthiazole ethiodide and
10 parts of ethyl iso-thio-(4-chloropropionanilide)
was heated at about 148 to 150° C. for 2 hours while stirring. The product was worked up in the same manner as in Example 1. The product, which was in the form of red crystals, was obtained in a yield of 66 per cent of theory. It had a melting point of 247° C. (from methanol) and possessed the following constitution:

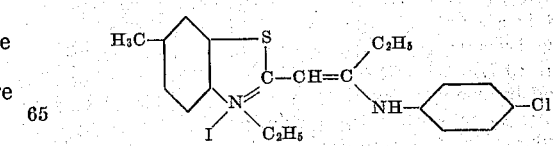

The procedure was repeated while using the same thioimide, except that the phenyl radical attached to the nitrogen atom was unsubstituted in one case, was substituted in the para-position by methyl in another case, and in the para-position by nitro in the third case. The yield in the first case was 48 per cent of theory, in the second case 38 per cent of theory, and in the third case 12 per cent of theory.

Example 4

5 parts of 2-methyl-5-methoxybenzselenazole ethiodide and
30 cc. of pyridine were heated to reflux, and 5 parts of the intermediate of Example 3 are slowly added. The mixture was refluxed for about 1½ hours, and after cooling there was added thereto 0.1 part of potassium iodide in
1 part of distilled water.
30 cc. of ethyl acetate were then added and the mixture chilled, filtered and washed with distilled water and ethyl acetate.

The product was crystallized from 95 per cent pyridine by precipitation with ethyl acetate. It was in the form of lustrous green crystals melting at 227° C. and was obtained in a yield of about 35 to 40 per cent of theory. The product when incorporated in gelatin absorbed light waves in the range of 650 to 660 mu. The product, which is [3-ethyl-6-methyl-benzthiazole-(2)]-[3-ethyl-6-methoxybenzselenazole-(2)]-beta-ethyl-trimethinecyanine iodide, the following structural formula:

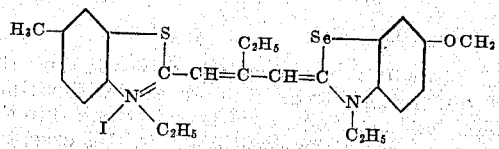

This procedure was repeated while using an intermediate obtained from the same thioimide, except that the phenyl radical attached to the nitrogen atom thereof was unsubstituted. The trimethine cyanine thus obtained was produced in a yield of about 18.8 per cent of theory.

Example 5

20 parts of 2-methylbenzothiazole ethiodide and
20 parts of ethyl iso-thio-(4-chloropropionanilide) were heated for 2 hours at about 148 to 150° C. in an open flask. The mixture was then cooled to about 100 to 105° C. and
35 cc. of methanol were added thereto. After stirring for about ½ hour, the mixture is cooled with an ice-salt mixture for about 3 hours, filtered and washed twice with ether. 23.5 parts of the product were obtained in the form of red crystals melting at 225° C.

Example 6

20 parts of 2-methyl-5-methoxybenzselenazole ethiodide were charged into a reactor equipped with a reflux condenser containing 120 cc. of pyridine. The mixture was refluxed for 15 minutes and there was added thereto over a period of 1 hour 20 parts of the intermediate of Example 5.

The mixture is then heated under reflux for 1½ hours, cooled to room temperature, and poured into a solution of 4 parts of potassium iodide and 60 cc. of water. The mixture is then well shaken and poured into 120 cc. of ethyl acetate. The mixture was refrigerated for 24 hours, then filtered. The solid product retained by the filter was washed 5 times with water, 5 times with ethyl acetate, 3 times with ether, after which it was dried over barium chloride. 21.3 parts of green crystals melting at 195 to 200° C. were obtained. The product was purified by crystallization from methanol and a small amount of pyridine. The dye thus obtained was in the form of green crystals melting at 140-142° C. The yield was 35 per cent of theory.

The procedure was twice repeated while using intermediates derived from the same thioimide, except that in one case the phenyl radical attached to the nitrogen atom thereof was unsubstituted and in the other case was substituted in the para-position by a methyl radical. The yield in the first instance was 24 per cent of theory and in thme second case, 16.3 per cent of theory.

Example 7

4.54 parts of ethyl iso-thio-(4-bromopropionanilide) and
5.07 parts of 2-methylbenzselenazole ethiodide were heated for 2 hours at about 148 to 150° C. and worked up in the manner provided for in Example 1. 5.13 parts of a yellow powder having a melting point of 220° C. after crystallization from methanol were thus obtained. The product has the following structure:

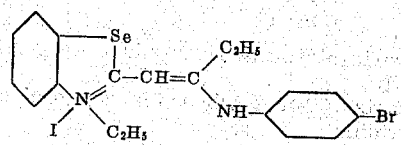

8.76 parts of the above product and
8.76 parts of 2-methylbenzselenazole ethiodide were refluxed with 50 cc. of pyridine and the mixture was worked up in the manner described in Example 6. The dye was obtained in the form of green crystals melting at 210-211° C. in a yield of 45.8 per cent of theory. The product, which is bis-[3-ethyl-benzselenazole-(2)]-beta-ethyl-trimethinecyanine iodide, has the following structural formula:

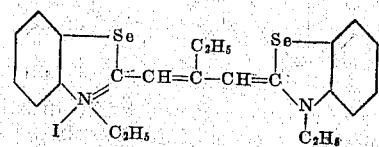

The procedure was repeated three times while using the same thioimide, except that the phenyl radical attached to the nitrogen atom in the first instance was unsubstituted and in the second instance was substituted in the para-position by methyl and in the third instance in the para-position by nitro. In the first case, the yield of trimethine cyanine dyestuff was 26.2 per cent, in the second case, 25.4 per cent, and in the third case, 21.7 per cent of theory.

Example 8

4.54 parts of ethyl iso-thio-(4-bromopropionanilide) and
4.78 parts of 2-methyl-5-methoxybenzoxazole ethiodide were reacted in the manner described in Example 1. There were thus obtained 2.16 parts of a tan powder having a melting point of 210 to 212° C. and the following structure:

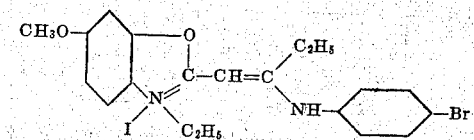

1.8 parts of this intermediate and
1.8 parts of 2.6-dimethylbenzthiazole ethiodide were refluxed with 10 cc. of pyridine and worked up in the manner described in Example 6. The dyestuff, which is identical with that of Example 1, is obtained in a yield of 21.2 per cent of theory.

*Example 9*

5 parts of ethyl iso-thio-(4-chloropropionanilide) and
5 parts of 2.5.6-trimethylbenzoxazole ethiodide were heated for 2 hours at 145-150° C. After working up the reaction mixture as described in Example 1, there were obtained 3.9 parts of a product in the form of orange crystals melting at about 200° C. The product had the following structural formula:

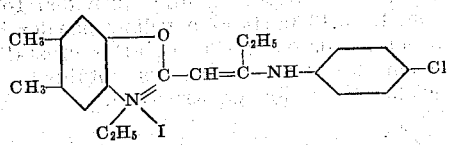

3.9 parts of the above product were refluxed with
3.1 parts of 2-methylbenzothiazole ethiodide in pyridine and the reaction mixture was worked up as described in Example 1. The dyestuff in the form of blue-green crystals melting at 170° C. was obtained in a yield of 32 per cent of theory. The dyestuff, which is [3-ethyl-5.6-dimethyl-benzoxazole-(2)] - [3-ethyl - benzthiazole - (2)] - beta-ethyl-trimethinecyanine iodide, has the following structural formula:

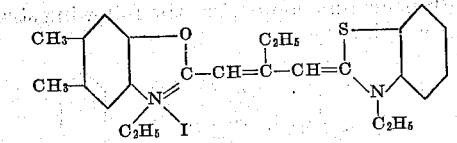

The procedure was repeated while utilizing the same thioimide except that the phenyl radical attached to the nitrogen atom thereof is unsubstituted. The dyestuff in this case was obtained in a yield of only 9 per cent of theory.

*Example 10*

A mixture of
10 parts of 2.6-dimethylbenzothiazole ethiodide and
9.4 parts of ethyl iso-thio-(4-chloroacetanilide) was heated at 148-150° C. for 2 hours while stirring. The mixture was cooled to 110° C. and 25 cc. of methanol were thereupon added. The mixture was refrigerated over night and filtered. The solid residue was washed twice with 10 cc. of ether. The product in the form of tan crystals having a melting point of 263-264° C. was obtained in a yield of about 65 per cent of theory. The product had the following structural formula:

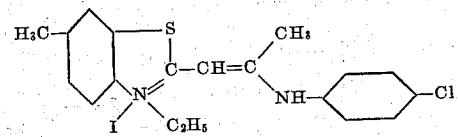

The procedure was repeated while using the same thioimide except that the phenyl radical attached to the nitrogen atom thereof was unsubstituted. The yield was 49.5 per cent of theory.

*Example 11*

5 parts of 2-methyl-5-methoxybenzselenazole ethiodide were mixed with 30 cc. of pyridine, and the mixture heated to reflux.
4.85 parts of the product of Example 10 were slowly added and the mixture refluxed for 1½ hours. After cooling the mixture, .1 part of potassium iodide in 1 part of distilled water was added. 30 cc. of ethyl acetate were then incorporated in the mixture and the same was chilled and filtered. The filtered product obtained was washed with distilled water, ethyl acetate and ether and recrystallized from 10 parts of 95 per cent pyridine by precipitation with 10 per cent of ethyl acetate. The product in the form of lustrous dark blue crystals melting at 244° C. was obtained in a yield of 75 per cent of theory. The product, which is [3-ethyl-6-methyl-benzthiazole- (2)]-[3-ethyl-6-methoxy - benzselenazole-(2)]-beta-methyl-trimethinecyanine iodide, has the following structural formula:

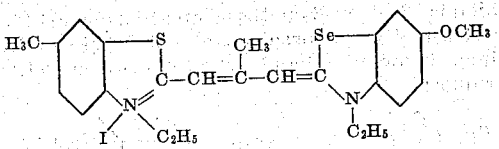

The procedure was repeated while utilizing the intermediate of Example 10 prepared with a thioimide in which the phenyl radical attached to the nitrogen atom is unsubstituted. In this case, the yield of dyestuff was only 45 per cent of theory.

*Example 12*

10 parts of 2-methyl-5-methoxybenzoxazole ethiodide were mixed with 9.4 parts of ethyl iso-thio-(p-chloroacetanilide) and the mixture was heated at 148-150° C. and worked up as in Example 11. The product in the form of yellow needles melting at 198-199° C. was obtained in a yield of 53.5 per cent of theory. The product had the following structural formula:

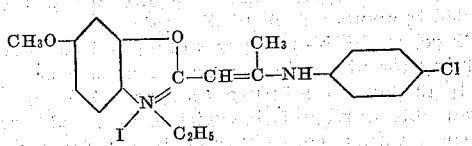

The procedure was repeated while utilizing the same thioimide except that the phenyl radical attached to the nitrogen atom was unsubstituted. The yield of intermediate obtained was only 48 per cent of theory.

5 parts of 2.6-dimethylbenzothiazole ethiodide and
6.23 parts of the product of the above formula were refluxed with pyridine and worked up as in Example 11. The product was recrystallized from 20 parts of 95 per cent pyridine. The dyestuff in the form of lustrous purple crystals melting at 241-242° C. was obtained in a yield of 26.9 per cent of theory. The product, which is [3-ethyl-6-methyl-benzthiazole-(2)]-[3-ethyl - 6 - methoxy-benzoxazole-(2)]-beta-methyl - trimethinecyanine iodide, has the following structural formula:

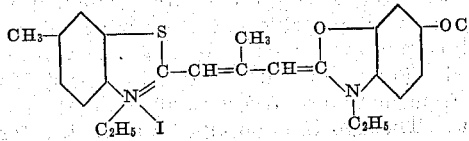

Example 13

20 parts of 2-methylbenzthiazole ethiodide and
19.65 parts of ethyl iso-thio-(p-chloroacetanilide)

were mixed and the mixture was heated for 2 hours at 148–150° C. The mixture was then worked up as in Example 11 to a dark red powder melting at 227–228° C. The yield was 65 per cent of theory. The product had the following structural formula:

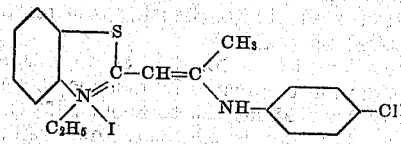

10 parts of 2-methylbenzothiazole ethiodide were refluxed with 60 cc. of pyridine and to the mixture there were added 11.7 parts of the above intermediate. The product after isolation from the reaction mixture was recrystallized from methanol. It was obtained in the form of copper-colored plates in a yield of 40 per cent of theory. The product, which is bis-[3-ethyl-benzthiazole-(2)]-beta-methyl-trimethinecyanine iodide, has the following structural formula:

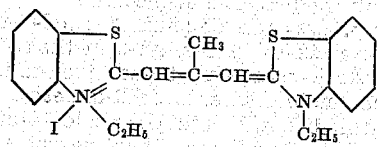

When proceeding in exactly the same but while utilizing a thioimide in which the phenyl radical attached to the nitrogen atom is unsubstituted, the yield of the dyestuff is only 28 per cent of theory.

Example 14

3 parts of 2.6-dimethylbenzthiazole ethiodide were refluxed with 18 cc. of pyridine. There were then added to the reaction mixture 3.5 parts of the intermediate described in Example 10. The reaction mixture was then processed in the manner outlined in Example 11. The dyestuff was obtained in the form of lustrous purple needles melting at 283° C. in a yield of 38.5 per cent of theory. The dyestuff, which is bis-[3-ethyl-6-methyl-benzthiazole-(2)]-beta-methyl-trimethinecyanine iodide, has the following constitution:

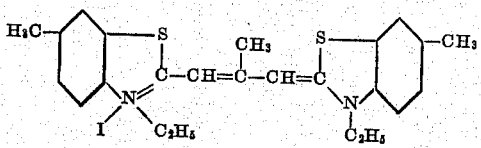

While utilizing an intermediate prepared from a thioimide in which the phenyl radical attached to the nitrogen atom is unsubstituted, the yield of the dyestuff obtained is only 29.4 per cent of theory.

Example 15

10 parts of 2-methylbenzselenazole ethiodide were mixed with
8.45 parts of ethyl iso-thio-(p-chloroacetanilide) and the mixture was heated at 148–150° C. for 2 hours. The mixture was then worked up in the manner described in Example 10. The product in the form of brown crystals melting at 259–260° C. was obtained in a yield of 79 per cent of theory. The product had the following structural formula:

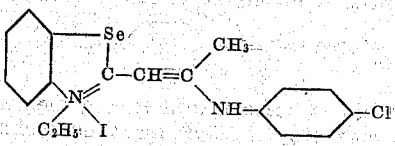

By proceeding in the same manner while utilizing a thioimide in which the phenyl radical attached to the nitrogen atom is unsubstituted, the yield of intermediate was 58 per cent of theory.

5 parts of 2-methylbenzselenazole ethiodide were reacted with
4.61 parts of the intermediate of the above structural formula in the manner disclosed in Example 11. The product after recrystallization from 15 parts of 95 per cent pyridine, was obtained in the form of green needles melting at 284° C. The yield was 25.2 per cent of theory. The dyestuff, which is bis-[3-ethyl-benzselenazole-(2)]-beta-methyl-trimethinecyanine iodide, has the following structural formula:

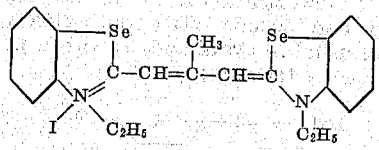

Similar results are obtained when the ethyl iso-thio-(p-chloroacetanilide) is replaced by an equivalent amount of ethyl iso-thio-(p-chlorobenzylanilide).

Example 16

2.74 parts of quinaldine ethiodide and
3.3 parts of the intermediate depicted by structural formula in Example 10 were refluxed with 20 cc. of pyridine for 1½ hours.

20 cc. of ethyl acetate were added, the mixture chilled and filtered. The solid after recrystallization from 10 parts of 95 per cent pyridine was in the form of dark green needles. The yield was 58 per cent of theory. The product, which is [3-ethyl-quinoline-(2)]-[3-ethyl-benzthiazole-(2)]-beta-methyl-trimethinecyanine iodide, has the following structural formula:

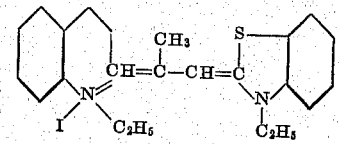

Various modifications of the invention will occur to persons skilled in the art, and we accordingly do not intend to be limited in the patent granted except as required by the prior art and the appended claims.

We claim:

1. In a process of producing trimethine cyanine dyes in which the meso carbon atom of the trimethenyl chain is substituted by a radical selected from the class consisting of alkyl and monocyclic aryl radicals, the step which comprises heating a cycloammonium quaternary salt of the following formula:

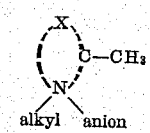

in which X represents the atoms necessary to complete a heterocyclic nitrogenous ring system of the type usual in cyanine dyes with a compound of the following structural formula:

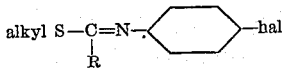

in which hal is halogen and R is a member of the class consisting of alkyl and mono-cyclic aryl radicals.

2. The process as defined in claim 1 wherein the reaction is effected in the absence of a condensing agent.

3. The process of producing trimethine cyanine dyes in which the meso carbon atom of the trimethine chain is substituted by a radical selected from the class consisting of alkyl and monocyclic aryl radicals which comprises heating a compound of the following structural formula:

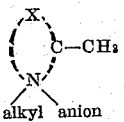

in which X represents the atoms necessary to complete a heterocyclic nitrogenous ring system of the type usual in cyanine dyes with a product of the following formula:

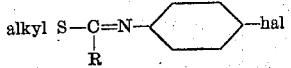

in which hal is halogen and R is a member of the class consisting of alkyl and mono-cyclic aryl radicals, and further heating the intermediate so obtained with a cycloammonium quaternary salt of the following formula:

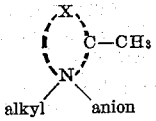

in which X has the value given above.

4. The process as defined in claim 3 wherein the last-named cycloammonium quaternary salt is different from the first-named cycloammonium quaternary salt.

5. The process as defined in claim 1 wherein hal is chlorine.

6. The process as defined in claim 3 wherein hal is chlorine.

7. The process as defined in claim 3 wherein the first reaction takes place in the absence of a condensing agent and the second reaction takes place in the presence of a basic condensing agent.

8. The process as defined in claim 1 wherein the reaction is effected by heating to a temperature ranging between 125 to 200° C.

9. The process as defined in claim 1 wherein the reaction is effected by heating to a temperature of about 150° C.

10. The process as defined in claim 3 wherein the first reaction is effected by heating to a temperature of from about 125 to about 200° C. and the second reaction is effected while refluxing the reaction mixture.

11. The process as defined in claim 1 wherein the cycloammonium quaternary salt and the thioimide are used in equimolecular proportions.

12. The process of producing [3-ethyl-6-methyl-benzthiazole-(2)]-[3-ethyl-6-methoxy-benzoxazole-(2)]-beta-ethyl-trimethine-cyanine iodide which comprises heating 2-methyl-5-methoxy-benzoxazole ethiodide with ethyl iso-thio-(4-chloropropionanilide) and heating the intermediate thus obtained with 2.6-dimethyl benzthiazole ethiodide in the presence of pyridine.

13. The process of producing [3-ethyl-6-methyl-benzthiazole-(2)]-[3-ethyl-6-methoxy-benzselenazole-(2)]-beta-ethyl-trimethinecyanine iodide which comprises heating 2.6-dimethyl benzthiazole ethiodide with ethyl iso-thio-(4-chloropropionanilide) and further heating the resulting product with 2-ethyl-5-methoxy-benzselenazole ethiodide in the presence of pyridine.

14. The process of producing bis-[3-ethyl-6-methyl-benzthiazole-(2)]-beta-methyl-trimethinecyanine iodide which comprises heating 2-methyl-benzthiazole ethiodide with ethyl iso-thio-(p-chloroacetanilide) and further heating the resulting product with 2.6-dimethyl benzthiazole ethiodide in the presence of pyridine.

PAUL NAWIASKY.
ROBERT JAMES SPEER.

Certificate of Correction

Patent No. 2,378,783.　　　　　　　　　　　　　　　　　　　　　June 19, 1945.

PAUL NAWIASKY ET AL.

It is hereby certified that errors appear in the printed specification of the above numbered patent requiring correction as follows: Page 3, first column, line 28, Example 4, for that portion of the formula reading "OCH$_2$" read *OCH$_3$*; page 6, second column, line 37, claim 13, for "2-ethyl" read *2-methyl*; and that the said Letters Patent should be read with these corrections therein that the same may conform to the record of case in the Patent Office.

Signed and sealed this 24th day of June, A. D. 1947.

[SEAL]

LESLIE FRAZER,
*First Assistant Commissioner of Patents.*